United States Patent
Miao

(10) Patent No.: US 9,687,782 B1
(45) Date of Patent: Jun. 27, 2017

(54) GENERATION AND DELIVERY OF AMMONIA GAS IN AN EXHAUST GAS SYSTEM

(71) Applicant: GM GLOBAL TECHNOLOGY OPERATIONS LLC, Detroit, MI (US)

(72) Inventor: Yong Miao, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/014,562

(22) Filed: Feb. 3, 2016

(51) Int. Cl.
| F01N 3/00 | (2006.01) |
| F01N 3/10 | (2006.01) |
| F01N 3/02 | (2006.01) |
| B01D 53/86 | (2006.01) |
| F01N 3/20 | (2006.01) |
| F01N 9/00 | (2006.01) |
| F01N 11/00 | (2006.01) |

(52) U.S. Cl.
CPC ..... B01D 53/8634 (2013.01); B01D 53/8696 (2013.01); F01N 3/208 (2013.01); F01N 9/00 (2013.01); F01N 11/00 (2013.01); F01N 2410/04 (2013.01); F01N 2610/02 (2013.01); F01N 2610/06 (2013.01)

(58) Field of Classification Search
CPC ...... F01N 2610/02–2610/06; F01N 2610/102; F01N 3/206; F01N 3/208; F01N 3/2896; F01N 2410/04; F01N 9/00; F01N 11/00; B01D 53/8634; B01D 53/8696
USPC ................ 60/286, 295, 297, 301, 303, 311
See application file for complete search history.

(56) References Cited

U.S. PATENT DOCUMENTS

| 5,809,775 | A  | * | 9/1998 | Tarabulski | B01D 53/90 423/212 |
| 9,222,389 | B2 | * | 12/2015 | Henry | F01N 3/208 |
| 9,429,060 | B2 | * | 8/2016 | Henry | B01D 53/9495 |
| 2003/0188528 | A1 | * | 10/2003 | Tost | B01D 53/90 60/286 |
| 2008/0066453 | A1 | * | 3/2008 | Oberski | F01N 3/2066 60/286 |
| 2013/0199157 | A1 | * | 8/2013 | Henry | F01N 3/208 60/274 |

* cited by examiner

*Primary Examiner* — Phutthiwat Wongwian
*Assistant Examiner* — Diem Tran
(74) *Attorney, Agent, or Firm* — Quinn IP Law

(57) ABSTRACT

An exhaust gas system for an engine producing an exhaust gas includes an exhaust gas tube configured to receive the exhaust gas. A particulate filter is in fluid communication with the exhaust gas tube and configured to undergo thermal regeneration when the exhaust gas in the particulate filter is heated above a regeneration temperature. A generator unit is positioned downstream of the particulate filter and includes a first catalyst. A tank is configured to store a precursor material. The generator unit is configured to employ the precursor material and the heat generated for the thermal regeneration of the particulate filter to generate an ammonia gas from the precursor material. The system includes a controller having a processor and tangible, non-transitory memory on which is recorded instructions for executing a method of controlling generation of ammonia gas in the generator unit and injection of ammonia gas in the exhaust gas tube.

17 Claims, 2 Drawing Sheets

US 9,687,782 B1

GENERATION AND DELIVERY OF AMMONIA GAS IN AN EXHAUST GAS SYSTEM

TECHNICAL FIELD

The present invention relates generally to an exhaust gas system and more particularly, to generation and delivery of ammonia gas in an exhaust gas system.

BACKGROUND

Exhaust gas systems are used in order to reduce and manage various oxides of nitrogen, referred to collectively herein as NOx gases, that may be created in the combustion process. Exhaust gas systems generally employ a selective catalytic reduction (SCR) device which uses a reductant capable of reacting with NOx gases. An injector is typically used to selectively inject a reductant into the selective catalytic reduction device. Direct injection of a reductant may leave deposits which block and reduce the amount of reductant available.

SUMMARY

An exhaust gas system for an engine producing an exhaust gas includes an exhaust gas tube configured to receive the exhaust gas. A particulate filter is in fluid communication with the exhaust gas tube and configured to undergo thermal regeneration when the exhaust gas in the particulate filter is heated above a regeneration temperature. A generator unit is positioned downstream of the particulate filter and includes a first catalyst. A tank is operatively connected to the generator unit and configured to store a precursor material. The generator unit is configured to employ the precursor material and the heat generated for the thermal regeneration of the particulate filter to generate an ammonia gas from the precursor material, in the presence of the first catalyst.

The system may include a controller having a processor and tangible, non-transitory memory on which is recorded instructions for executing a method of controlling generation of the ammonia gas in the generator unit and delivery of the ammonia gas to the exhaust gas tube. A first flow control device may be positioned between the tank and the generator unit. Execution of the instructions by the processor causing the controller to determine if thermal regeneration is taking place. If thermal regeneration is taking place, the controller is programmed to open the first flow control device to at least partially permit the precursor material to flow from the tank to the generator unit.

The system may include a heat exchange unit having a first pathway configured for flow of a first fluid and a second pathway configured for flow of a first fluid. The first pathway and the second pathway are separated by at least one wall such that the first and second fluids do not physically mix and the heat generated for the thermal regeneration is transferred from the first fluid to the second fluid through the at least one wall.

A second flow control device may be operatively connected to the controller and positioned between the particulate filter and the generator unit. The generator unit and the heat exchange unit may share a common housing such that the first catalyst of the generator unit is installed in the second pathway of the heat exchange unit. The controller may be programmed to direct the second flow control device to at least partially permit the exhaust gas to flow from the particulate filter to the first pathway of the heat exchange unit during the thermal regeneration of the particulate filter.

A storage unit may be operatively connected to the generator unit and includes a storage material configured to adsorb the ammonia gas generated in the generator unit. A third flow control device may be operatively connected to the controller and positioned between the generator unit and the storage unit. The controller may be programmed to direct the third flow control device to at least partially permit the flow of the ammonia gas from the generator unit to the storage unit during the thermal regeneration of the particulate filter.

A heat source may be operatively connected to the controller and the controller may be programmed to direct the heat source to selectively provide a heat energy to the storage unit for releasing the ammonia gas adsorbed by the storage material. A fourth flow control device may be operatively connected to the controller and positioned between the storage unit and the exhaust gas tube. The controller may be programmed to direct the fourth flow control device to at least partially permit the ammonia gas to flow from the storage unit to the exhaust gas tube, irrespective of whether the thermal regeneration of the particulate filter is taking place. A selective catalytic reduction device may be in fluid communication with the exhaust gas tube and includes a second catalyst. The ammonia gas is configured to interact with the second catalyst in the selective catalytic reduction device to reduce a NOx level in the exhaust gas.

The above features and advantages and other features and advantages of the present disclosure are readily apparent from the following detailed description of the best modes for carrying out the disclosure when taken in connection with the accompanying drawings.

DETAILED DESCRIPTION

Figure 1:
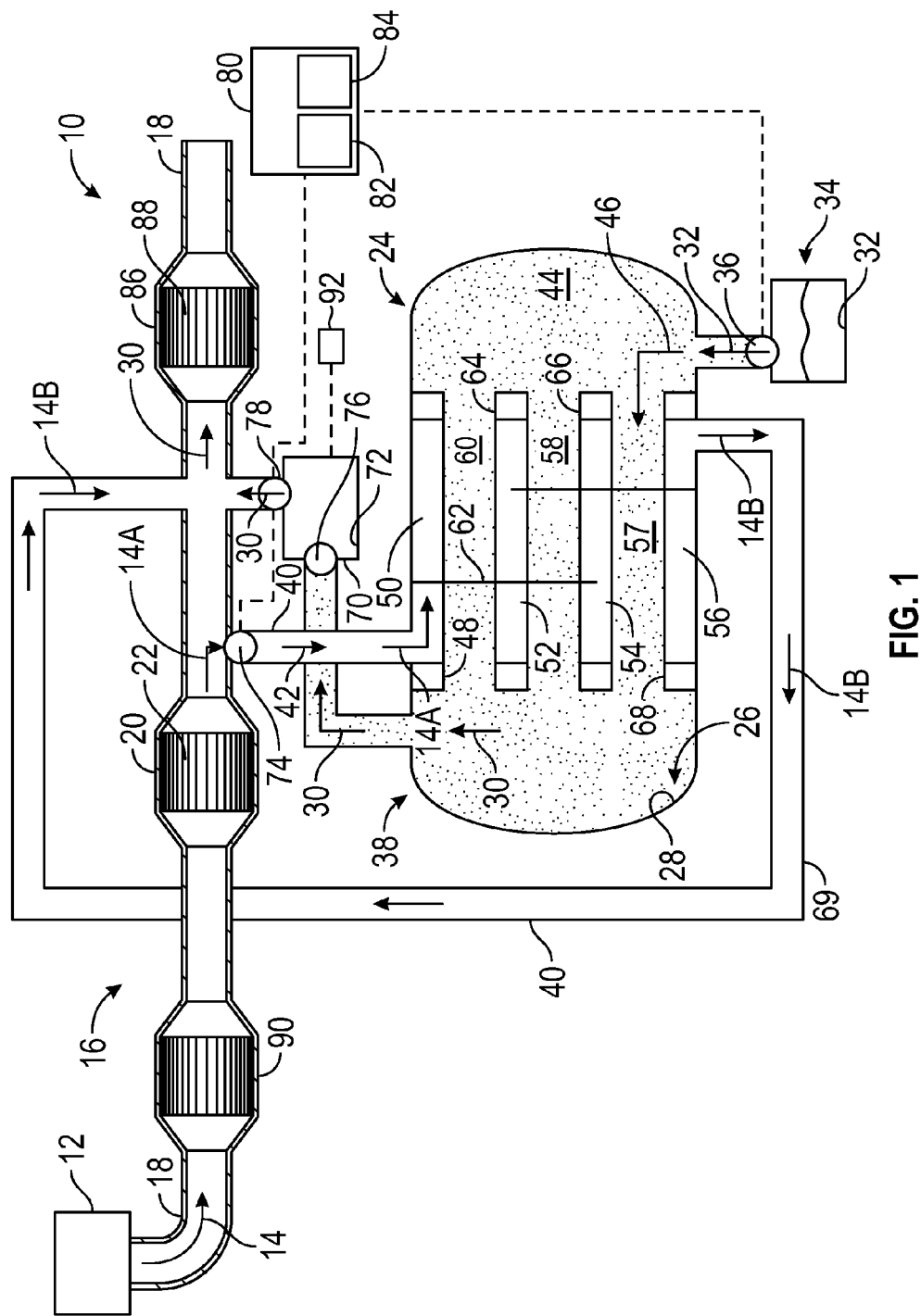
FIG. 1 is a schematic illustration of an exhaust gas system and a controller.

Referring to the drawings, wherein like reference numbers correspond to like or similar components throughout the several figures, a portion of a device 10 is shown in FIG. 1. The device 10 may be an automobile, a bicycle, a robot, farm implement, sports-related equipment or any other mobile platform. The device 10 may include an engine 12 producing an exhaust gas 14. In one example, the engine 12 is a diesel engine. However, the disclosure is applicable to any type of engine. The device 10 includes an exhaust gas system 16 for treating constituents in the exhaust gas 14, such as oxides of nitrogen (NOx). An exhaust gas tube 18 is in fluid communication with and configured to receive the exhaust gas 14 from the engine 12 or any other portion of the device 10 producing an exhaust gas 14.

Referring to FIG. 1, the exhaust gas system 16 includes a particulate filter 20 in fluid communication with the exhaust gas tube 18. The particulate filter 20 is configured to filter out particles or particulate matter produced by the engine 12. These particles may include soot, hydrocarbons, ashes and sulphuric acid. On regular intervals, the particulate filter 20 has to be thermally regenerated in order to remove the accumulated particles. Referring to FIG. 1, the particulate filter 20 may include a plurality of channels 22 which are one-ended and have respective porous walls. The exhaust gas 14 travels through the porous walls of the channels 22, leaving particles filtered on the walls of the channels 22. The channels 22 may be composed of ceramic or any other suitable materials. The particulate filter 20 is configured to undergo thermal regeneration when the exhaust gas 14 in the particulate filter 20 is heated above a regeneration or combustion temperature, thereby allowing the particles to combust or burn. In one example, the regeneration temperature is between 600-750° C. Any suitable method of performing regeneration may be employed, including but not limited to, using a fuel burner, using resistive heating coils and using microwave energy.

Referring to FIG. 1, a generator unit 24 is positioned downstream of the particulate filter and includes a first catalyst 26. The first catalyst 26 may be a solid having a first layer composed of the active material and a second layer composed of a base metal derivative that is rigidly attached to an inner surface 28 of the generator unit 24. The generator unit 24 is configured to employ the precursor material 32 and the heat generated by the thermal regeneration of the particulate filter 20 to produce an ammonia gas 30, in the presence of the first catalyst 26. A tank 34 is operatively connected to the generator unit 24 and configured to store the precursor material 32. Referring to FIG. 1, a first flow control device 36 is positioned between the tank 34 and the generator unit 24, in order to control the flow of precursor material 32 from the tank 34 to the generator unit 24.

It is to be understood that any type of precursor material 32 and first catalyst 26 known to those skilled in the art may be employed. The precursor material 32 may be urea [(NH2)2CO] and the first catalyst 26 may be a hydrolysis catalyst. In another example, the precursor material 32 is diesel exhaust fluid [(NH2) 2CO+H2O (32.5 wt %)]. The precursor material 32 may be liquid ammonia (NH3). Other examples of precursor material 32 include, but are not limited to: ammonium carbamate [NH4COONH2], ammonium carbonate [(NH4)2CO3], ammonium formate [NH4CHO2], magnesium ammine chloride [Mg(NH3)6Cl2], calcium ammine chloride [Ca(NH3)8Cl2] and strontium ammine chloride [Sr(NH3)8Cl2]. The precursor material 32 may be polyuria, which is a type of elastomer that is derived from the reaction product of an isocyanate component and a synthetic resin blend component through block-growth polymerization. The isocyanate can be aromatic or aliphatic in nature. It can be monomer, polymer, or any variant reaction of isocyanates, quasi-prepolymer or a prepolymer. The prepolymer, or quasi-prepolymer, can be made of an amine-terminated polymer resin, or a hydroxyl-terminated polymer resin. The resin blend may be made up of amine-terminated polymer resins, and/or amine-terminated chain extenders.

Referring to FIG. 1, the exhaust gas system 16 includes a heat exchange unit 38. The heat exchange unit 38 includes a first pathway 40 configured for flow of a first fluid 42 and a second pathway 44 configured for flow of a second fluid 46. For clarity, the second pathway 44 is lightly shaded in FIG. 1. The first pathway 40 and the second pathway 44 are separated such that the first and second fluids 42, 46 do not physically mix. The first pathway 40 and the second pathway 44 are separated by at least one wall 48 such that heat is transferred from the first fluid 42 to the second fluid 46, or vice-versa, through the at least one wall 48. Referring to FIG. 1, the first pathway 40 may be constructed as a series of tubes, supported by panels 62. The first pathway 40 may include a first tube 50, a second tube 52, a third tube 54 and a fourth tube 56. The second pathway 44 may include a plurality of interconnected passages, including a first passage 57, a second passage 58 and a third passage 60. Multiple tubes and passages allow for a large heat transfer area and therefore, efficient heat transfer.

Referring to FIG. 1, the generator unit 24 and the heat exchange unit 38 may share a common housing, such that the first catalyst 26 of the generator unit 24 is installed in the second pathway 44 of the heat exchange unit 38. During thermal regeneration of the particulate filter 20, the exhaust gas is heated to above a regeneration temperature; the hot exhaust gas is indicated by 14A (cooled exhaust gas is indicated by 14B). The first pathway 40 is configured to receive the hot exhaust gas 14A from the particulate filter 20 and the second pathway 44 is configured to receive the precursor material 32 from the tank 34. Heat is transferred from the hot exhaust gas 14A to the second pathway 44. Because the first catalyst 26 of the generator unit 24 is installed in the second pathway 44 and the precursor material 32 from the tank 34 flows into the second pathway 44, the ammonia gas 30 is generated in the second pathway 44. In one example, the precursor material 32 is urea and the first catalyst 26 is a hydrolysis catalyst. In this example, a hydrolysis reaction takes place in the second pathway 44, converting the urea into ammonia gas 30. The hydrolysis reaction is a two-block reaction, and one urea molecule turns into two ammonia (NH3) molecules, as shown below:

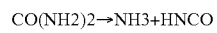

CO(NH2)2→NH3+HNCO

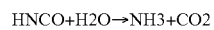

HNCO+H2O→NH3+CO2

Thus, the generator unit 24 employs the heat extracted from thermal regeneration of the particulate filter 20, to generate the ammonia gas 30, using the first catalyst 26 and the precursor material 32. Referring to FIG. 1, the heat may be transferred through the at least one wall 48 as well as additional walls, including a second wall 64, third wall 66 and fourth wall 68. Referring to FIG. 1, heat exchanger unit 38 includes a re-join channel 69 that allows the cooled exhaust gas 14B (cooled after transferring away its heat in the heat exchanger unit 38) to re-join the exhaust gas tube 18. The heat exchange unit 38 may also be housed separately from the generator unit 24.

Referring to FIG. 1, a storage unit 70 may be operatively connected to the generator unit 24 and includes a storage material 72 configured to adsorb the ammonia gas 30 produced in the generator unit 24. The storage unit 70 may be made of an inert material, such as stainless steel. The storage unit 70 may be a carbon polymer. In one example, the storage unit 70 is able to withstand pressures up to 5 bar and temperatures of up to 150 to 200 C. In one example, the storage material 72 is ammonium carbamate [NH4COONH2]. In another example, the storage material 72 is boric acid [(NH4)3BO3]. Other examples of storage material 72 include, but are not limited to: ammonium carbonate [(NH4)2CO3], ammonium formate [NH4CHO2], magnesium ammine chloride [Mg(NH3)6Cl2], calcium ammine chloride [Ca(NH3)8Cl2], strontium ammine chloride [Sr(NH3)8Cl2] and DEF [(NH2) 2CO+H2O (32.5 wt %)]. Any type of storage material 72 known to those skilled in the art may be employed.

Referring to FIG. 1, a second flow control device 74 may be positioned between the particulate filter 20 and the generator unit 24. A third flow control device 76 may be positioned between the generator unit 24 and the storage unit 70 and configured to control flow of the ammonia gas 30 from the generator unit 24 to the storage unit 70. A fourth flow control device 78 may be positioned between the storage unit 70 and the exhaust pathway. The fourth flow control device 78 allows for a quick response and accurate control of the amount of ammonia gas 30 to be delivered to the exhaust gas tube 18.

Referring to FIG. 1, a controller 80 is operatively connected to the first flow control device 36 and includes a processor 82 and tangible, non-transitory memory 84, on which is recorded instructions for executing a method 200 of controlling generation of the ammonia gas 30 in the generator unit 24 and delivery of the ammonia gas 30 to the exhaust gas tube 18. Execution of method 200 is described below with reference to FIG. 2.

In response to a control signal from the controller 80, the first, second, third and fourth flow control devices 36, 74, 76, 78 of FIG. 1 may each be independently moved or operated by a solenoid, a mechanical thermostat, a wax motor, vacuum actuator or other device. The first, second, third and fourth flow control devices 36, 74, 76, 78 may each operate in a binary mode, i.e. be either "on" (100% flow permitted) or "off" (0% or no flow permitted). The first, second, third and fourth flow control devices 36, 74, 76, 78 may each include multiple modes, e.g. a first mode for 0% or no flow permitted, a second mode for 25% flow permitted, a third mode for 75% flow permitted and a fourth mode for 100% flow permitted. It is to be understood that the first, second, third and fourth flow control devices 36, 74, 76, 78 may each employ any mechanism known to those skilled in the art and may include any number of modes.

Referring to FIG. 1, a selective catalytic reduction device 86 is in fluid communication with the exhaust gas tube 18. The selective catalytic reduction device 86 includes a second catalyst 88 aimed at reducing oxides of nitrogen (NOx) in the exhaust gas 14, by conversion to nitrogen and water vapor. The second catalyst 88 may be an oxide of a base metal such as vanadium, molybdenum, tungsten and zeolite. In one example, the second catalyst is an iron- or copper-exchanged zeolite. The second catalyst 88 may be contained in a washcoat that is coated onto the selective catalytic reduction device 86.

Referring to FIG. 1, the exhaust gas system 16 may include an oxidation catalyst 90, located upstream of the selective catalytic reduction device 86. The oxidation catalyst 90 converts the NO (nitrogen monoxide) gas into $NO_2$, which is easily treated in the selective catalytic reduction device 86. The exhaust gas system 16 may include one or more sensors at various locations for sensing the temperature, pressure, NOx levels and various other properties of the exhaust gas 14.

Figure 2:
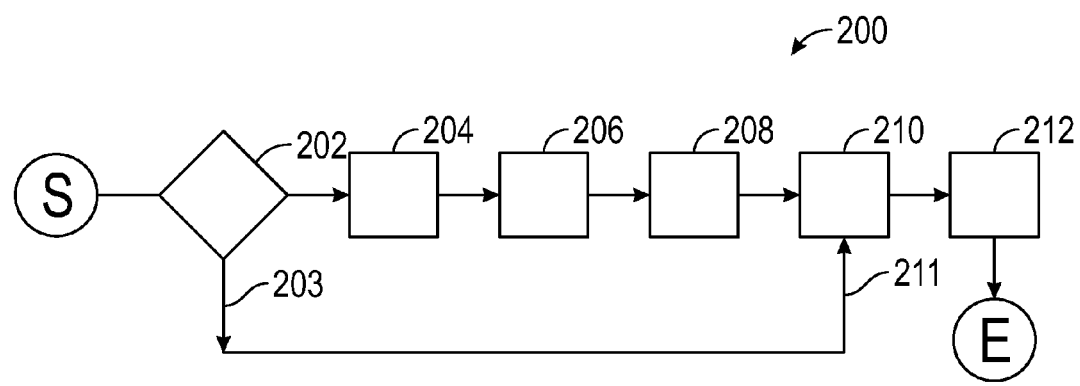
FIG. 2 is a schematic flow diagram for a method for the controller of FIG. 1.

Referring now to method 200 in FIG. 2, it is to be appreciated that the controller 80 may eliminate one or more blocks or may determine the blocks in an order other than as described above. The start and end functions are denoted in FIG. 2 as "S" and "E," respectively. Method 200 may begin with block 202, where the controller 80 of FIG. 1 determines whether thermal regeneration is taking place in the particulate filter 20. If thermal regeneration is not taking place, the method 200 may proceed to block 210, as indicated by line 203 and described below. If thermal regeneration of the particulate filter 20 is taking place, the method 200 proceeds to block 204.

In block 204 of FIG. 2, the controller 80 is programmed to open the first flow control device 36 to at least partially permit the precursor material 32 to flow from the tank 34 to the generator unit 24. The controller 80 may determine the amount of the precursor material 32 to be permitted to enter the generator unit 24 based upon a number of factors. The factors may include, but are not limited to, the respective amounts of NOx in the exhaust gas 14 upstream and downstream of the particulate filter 20 and the exhaust flow rate at the exhaust gas tube 18 of the engine 12.

The method 200 proceeds to block 206 from block 204. In block 206 of FIG. 2, (if thermal regeneration of the particulate filter 20 is taking place) the controller 80 is programmed to direct the second flow control device 74 (positioned between the particulate filter 20 and the generator unit 24) to at least partially permit the hot exhaust gas 14A to flow from the particulate filter to the first pathway 40 of the heat exchange unit 38, such that heat is transferred from the hot exhaust gas 14A to the precursor material 32 through the at least one wall 48. The heat generated from particulate filter regeneration is employed to generate the ammonia gas 30 using the precursor material 32, in the presence of the first catalyst 26.

The method 200 proceeds to block 208 from block 206. In block 208 of FIG. 2, the controller 80 may be programmed to direct the third flow control device 76 to at least partially permit the generated ammonia gas 30 to flow from the generator unit 24 to the storage unit 70. As noted above, the storage unit 70 employs a storage material 72 to adsorb or bind the ammonia gas 30.

In block 210 of FIG. 2, the controller 80 is programmed to selectively direct or control release of the ammonia gas 30 from the storage unit 70. In block 210, the controller 80 may be programmed to direct application of heat to the storage unit 70, for example, through a heat source 92. The heat source 92 may be an electrical wire activated by a switch. The application of heat releases the ammonia gas 30 that is bound to the storage material 72. The degree and duration of heat applied may be determined based on the amount of ammonia gas 30 needed in the exhaust gas tube 18, which in turn may be based on the level of NOx in the exhaust gas 14 detected by various sensors (not shown) in the exhaust gas system 16.

In block 212, the controller 80 is programmed to direct the fourth flow control device 78 to at least partially permit (which may be based on the amount of ammonia gas 30 needed, as determined above) the ammonia gas 30 to flow into the exhaust gas tube 18. Once delivered into the exhaust gas tube 18, the ammonia gas 30 enters into fluid communication with the selective catalytic reduction device 86, where a NOx reduction reaction takes place with the aid of the second catalyst 88, thereby reducing the amount of NOx emission in the exhaust gas 14. Dosing the selective catalytic reduction device 86 with ammonia gas 30, as opposed to directly injecting a precursor material 32 (such as urea) into the exhaust gas tube 18, may eliminate deposit issues arising from direct injection of precursor material 32 into the exhaust gas tube 18. Additionally, because ammonia gas 30 is relatively easy to mix with the exhaust gas, mixing length in the exhaust gas tube 18 is reduced. Energy is saved as the ammonia gas 30 is produced in the generator unit 24 by utilizing the heat energy from regeneration of the particulate filter 20, and no additional heat energy input is required.

The method 200 may proceed to blocks 210 and 212 from block 208 (thermal regeneration of the particulate filter taking place) or from block 202, as indicated by line 203 (no thermal regeneration taking place). In other words, the controller 80 may direct delivery of ammonia gas 30 stored in the storage unit 70 to the exhaust gas tube 18, regardless of whether thermal regeneration is taking place. The method 200 may run continuously during operation of the engine 12.

Figure 3:
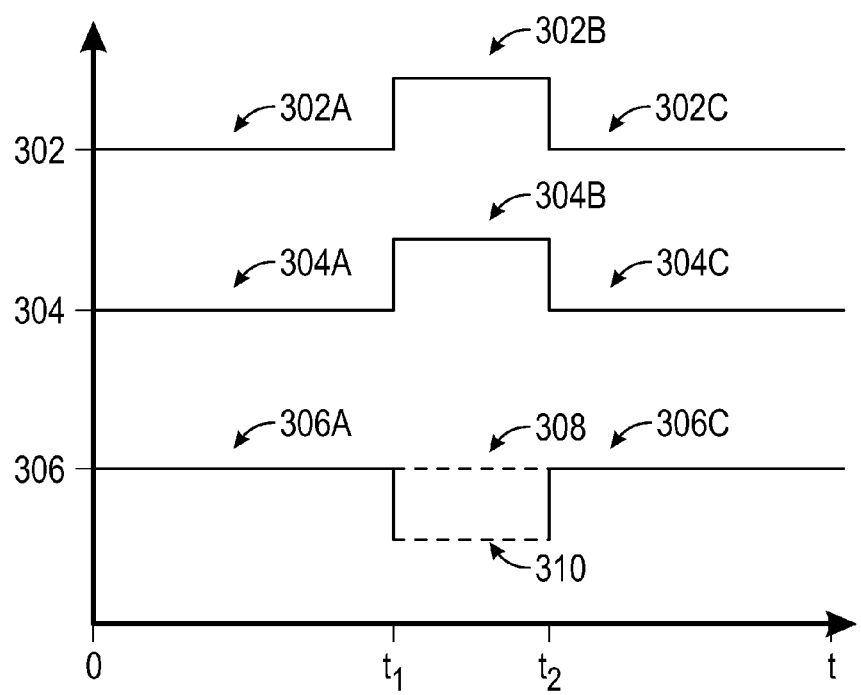
FIG. 3 is an example signal chart for the exhaust gas system of FIG. 1.

Referring to FIG. 3, an example signal chart for the exhaust gas system 16 is shown, with time t shown in the horizontal axis. The example shown in FIG. 3 is intended to be a non-limiting example. The vertical axis displays the particulate filter regeneration signal 302, the precursor entry signal 304 and the ammonia gas dosing signal 306. In the embodiment shown, each of the signals 302, 304 and 306 may be set to "on" or "off." The particulate filter regeneration signal 302 represents whether or not thermal regeneration of the particulate filter 20 is taking place. The precursor entry signal 304 represents whether or not the precursor material 32 is directed into the generator unit 24. The ammonia gas dosing signal 306 represents whether or not ammonia gas 30 is being delivered into the exhaust gas tube 18.

Referring to FIG. 3, between an initial time (e.g. t=0) and $t_1$, there is no thermal regeneration of the particulate filter 20 and the particulate filter regeneration signal 302 (see portion 302A) and the precursor entry signal 304 (see portion 304A) are both set to "off." The ammonia gas dosing signal 306 (see portion 306A) may be set to "on." Referring to FIG. 3, between times $t_1$ and $t_2$, thermal regeneration of the particulate filter 20 is taking place and the particulate filter regeneration signal 302 (see portion 302B) and the precursor entry signal 304 (see portion 304B) are both set to "on." The ammonia gas dosing signal 306 may be set to either "on" (see portion 308) or "off" (see portion 310).

Referring to FIG. 3, beyond time $t_2$, thermal regeneration of the particulate filter 20 is no longer taking place and the particulate filter regeneration signal 302 (see portion 302C) and the precursor entry signal 304 (see portion 304C) are both set back to "off" and the ammonia gas dosing signal 306 (see portion 306C) may be set to "on." In summary, ammonia gas 30 is generated during the thermal regeneration of the particulate filter 20 and stored in the storage unit 70 (e.g., by binding to the storage material 72) for selective delivery to the exhaust gas tube 18 (e.g., through application of the heat source 92). Depending on the requirements of the exhaust gas system 16, the controller 80 may direct delivery of the ammonia gas 30 stored in the storage unit 70 to the exhaust gas tube 18 at all times, regardless of whether thermal regeneration is taking place.

The controller 80 of FIG. 1 may include a microprocessor or computer having a central processing unit, memory (RAM and/or ROM), and associated input and output buses. The controller 80 may be an application-specific integrated circuit or may be formed of other logic devices known in the art. The controller 80 may include a pathway of a central vehicle main control unit such as the engine control module (ECM), an interactive vehicle dynamics module, a main control module, a control circuit having a power supply, combined into a single integrated control module, or may be a stand-alone control module.

The controller 80 of FIG. 1 may include a computing device that employs an operating system or processor for storing and executing computer-executable instructions. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An exhaust gas system for treating an exhaust gas, the system comprising:
   an exhaust gas tube configured to receive the exhaust gas;
   a particulate filter in fluid communication with the exhaust gas tube and configured to undergo thermal regeneration when the exhaust gas in the particulate filter is heated above a regeneration temperature, thereby generating heat;
   a generator unit positioned downstream of the particulate filter and including a first catalyst;
   a tank operatively connected to the generator unit and configured to store a precursor material;
   a first flow control device positioned between the tank and the generator unit, the first flow control device being configured to control flow of the precursor material from the tank to the generator unit;
   wherein the generator unit is configured to employ the precursor material and the heat generated due to the thermal regeneration of the particulate filter to generate an ammonia gas.

2. The exhaust gas system of claim 1, further comprising:
   a controller including a processor and tangible, non-transitory memory on which is recorded instructions for executing a method of controlling generation of the ammonia gas in the generator unit and delivery of the ammonia gas to the exhaust gas tube, execution of the instructions by the processor causing the controller to:

determine if the thermal regeneration is taking place; and if the thermal regeneration is taking place, direct the first flow control device to at least partially permit the precursor material to flow from the tank to the generator unit.

3. The exhaust gas system of claim 2, further comprising:

a heat exchange unit having a first pathway configured for flow of a first fluid and a second pathway configured for flow of a second fluid, the heat exchange unit being operatively connected to the particulate filter;

wherein the first pathway and the second pathway are separate such that the first and second fluids do not physically mix; and wherein the first pathway and the second pathway are separated by at least one wall such that the heat generated for the thermal regeneration is transferred from the first fluid to the second fluid through the at least one wall.

4. The exhaust gas system of claim 3, further comprising:

a second flow control device operatively connected to the controller and positioned between the particulate filter and the heat exchange unit;

wherein the controller is programmed to direct the second flow control device to at least partially permit the exhaust gas to flow from the particulate filter to the first pathway of the heat exchange unit during the thermal regeneration of the particulate filter.

5. The exhaust gas system of claim 3:

wherein the generator unit and the heat exchange unit share a common housing such that the first catalyst of the generator unit is installed in the second pathway of the heat exchange unit; and wherein the controller is programmed to direct the first flow control device to at least partially permit the flow of the precursor material from the tank to the second pathway of the heat exchange unit during the thermal regeneration of the particulate filter.

6. The exhaust gas system of claim 2, further comprising:

a storage unit operatively connected to the generator unit and including a storage material configured to adsorb the ammonia gas;

a third flow control device operatively connected to the controller and positioned between the generator unit and the storage unit;

wherein the controller is programmed to direct the third flow control device to at least partially permit the flow of the ammonia gas from the generator unit to the storage unit during the thermal regeneration of the particulate filter.

7. The exhaust gas system of claim 6, further comprising:

a heat source operatively connected to the controller, wherein the controller is programmed to direct the heat source to selectively provide a heat energy to the storage unit for releasing the ammonia gas adsorbed by the storage material;

a fourth flow control device operatively connected to the controller and positioned between the storage unit and the exhaust gas tube;

wherein the controller is programmed to direct the fourth flow control device to at least partially permit the flow of the ammonia gas from the storage unit to the exhaust gas tube, irrespective of whether the thermal regeneration of the particulate filter is taking place.

8. The exhaust gas system of claim 6, further comprising:

a selective catalytic reduction device in fluid communication with the exhaust gas tube and including a second catalyst; and wherein the ammonia gas is configured to interact with the second catalyst in the selective catalytic reduction device to reduce a NOx level in the exhaust gas.

9. A vehicle comprising:

an engine;

an exhaust gas tube in fluid communication with and configured to receive an exhaust gas from the engine;

a particulate filter in fluid communication with the exhaust gas tube and configured to undergo thermal regeneration when the exhaust gas in the particulate filter is heated above a regeneration temperature;

a generator unit positioned downstream of the particulate filter and including a first catalyst;

a tank operatively connected to the generator unit and configured to store a precursor material;

a first flow control device positioned between the tank and the generator unit, the first flow control device being configured to control flow of the precursor material from the tank to the generator unit;

wherein the generator unit is configured to employ the precursor material and the heat generated due to the thermal regeneration of the particulate filter to produce an ammonia gas; and a controller including a processor and tangible, non-transitory memory on which is recorded instructions for executing a method of controlling generation of the ammonia gas in the generator unit and delivery of the ammonia gas to the exhaust gas tube, execution of the instructions by the processor causing the controller to direct the first flow control device to at least partially permit the precursor material to flow from the tank to the generator unit if the thermal regeneration is taking place.

10. The vehicle of claim 9, further comprising:

a heat exchange unit having a first pathway configured for flow of a first fluid and a second pathway configured for flow of a second fluid, the heat exchange unit being operatively connected to the particulate filter;

wherein the first pathway and the second pathway are separate such that the first and second fluids do not physically mix; and wherein the first pathway and the second pathway are separated by at least one wall such that the heat generated for the thermal regeneration is transferred from the first fluid to the second fluid through the at least one wall.

11. The vehicle of claim 10, further comprising:

a second flow control device operatively connected to the controller and positioned between the particulate filter and the heat exchange unit; and wherein the controller is programmed to direct the second flow control device to at least partially permit the exhaust gas to flow from the particulate filter to the first pathway of the heat exchange unit during the thermal regeneration of the particulate filter.

12. The vehicle of claim 11:

wherein the generator unit and the heat exchange unit share a common housing such that the first catalyst of the generator unit is installed in the second pathway of the heat exchange unit; and wherein the controller is programmed to direct the first flow control device to at least partially permit the flow of the precursor material from the tank to the second pathway of the heat exchange unit during the thermal regeneration of the particulate filter.

13. The vehicle of claim 12, further comprising:
a storage unit operatively connected to the generator unit and including a storage material configured to adsorb the ammonia gas;
a third flow control device operatively connected to the controller and positioned between the generator unit and the storage unit; and
wherein the controller is programmed to direct the third flow control device to at least partially permit the flow of the ammonia gas from the generator unit to the storage unit during the thermal regeneration of the particulate filter.

14. The vehicle of claim 13, further comprising:
a heat source operatively connected to the controller, wherein the controller is programmed to direct the heat source to selectively provide a heat energy to the storage unit for releasing the ammonia gas adsorbed by the storage material;
a fourth flow control device operatively connected to the controller and positioned between the storage unit and the exhaust gas tube; and
wherein the controller is programmed to direct the fourth flow control device to at least partially permit the flow of the ammonia gas from the storage unit to the exhaust gas tube, irrespective of whether the thermal regeneration of the particulate filter is taking place.

15. The vehicle of claim 14, further comprising:
a selective catalytic reduction device in fluid communication with the exhaust gas tube and including a second catalyst; and
wherein the ammonia gas is configured to interact with the second catalyst in the selective catalytic reduction device to reduce a NOx level in the exhaust gas.

16. An exhaust gas system for treating an exhaust gas, the system comprising:
an exhaust gas tube configured to receive the exhaust gas;
a particulate filter in fluid communication with the exhaust gas tube and configured to undergo thermal regeneration when the exhaust gas in the particulate filter is heated above a regeneration temperature, thereby generating heat;
a generator unit positioned downstream of the particulate filter and including a first catalyst;
a tank operatively connected to the generator unit and configured to store a precursor material;
a first flow control device positioned between the tank and the generator unit, the first flow control device being configured to control flow of the precursor material from the tank to the generator unit;
wherein the generator unit is configured to employ the precursor material and the heat generated due to the thermal regeneration of the particulate filter to produce an ammonia gas;
a controller including a processor and tangible, non-transitory memory on which is recorded instructions for executing a method of controlling generation of the ammonia gas in the generator unit and delivery of the ammonia gas to the exhaust gas tube, execution of the instructions by the processor causing the controller to direct the first flow control device to at least partially permit the precursor material to flow from the tank to the generator unit, if the thermal regeneration is taking place;

a heat exchange unit having a first pathway configured for flow of a first fluid and a second pathway configured for flow of a second fluid, the heat exchange unit being operatively connected to the particulate filter;
wherein the first pathway and the second pathway are separate such that the first and second fluids do not physically mix;
wherein the first pathway and the second pathway are separated by at least one wall such that the heat generated for the thermal regeneration is transferred from the first fluid to the second fluid through the at least one wall;
a second flow control device operatively connected to the controller and positioned between the particulate filter and the heat exchange unit;
wherein the controller is programmed to direct the second flow control device to at least partially permit the exhaust gas to flow from the particulate filter to the first pathway of the heat exchange unit during the thermal regeneration of the particulate filter;
wherein the generator unit and the heat exchange unit share a common housing such that the first catalyst of the generator unit is installed in the second pathway of the heat exchange unit;
wherein the controller is programmed to direct the first flow control device to at least partially permit the flow of the precursor material from the tank to the second pathway of the heat exchange unit during the thermal regeneration of the particulate filter;
a storage unit operatively connected to the generator unit and including a storage material configured to adsorb the ammonia gas;
a third flow control device operatively connected to the controller and positioned between the generator unit and the storage unit; and
wherein the controller is programmed to direct the third flow control device to at least partially permit the flow of the ammonia gas from the generator unit to the storage unit during the thermal regeneration of the particulate filter.

17. The exhaust gas system of claim 10, further comprising:
a heat source operatively connected to the controller, wherein the controller is programmed to direct the heat source to selectively provide a heat energy to the storage unit for releasing the ammonia gas adsorbed by the storage material;
a fourth flow control device operatively connected to the controller and positioned between the storage unit and the exhaust gas tube;
a selective catalytic reduction device in fluid communication with the exhaust gas tube and including a second catalyst;
wherein the controller is programmed to direct the fourth flow control device to at least partially permit the flow of the ammonia gas from the storage unit to the exhaust gas tube, irrespective of whether the thermal regeneration of the particulate filter is taking place; and
wherein the ammonia gas is configured to interact with the second catalyst in the selective catalytic reduction device to reduce a NOx level in the exhaust gas.

* * * * *